(12) United States Patent
Mortimer et al.

(10) Patent No.: US 10,618,227 B2
(45) Date of Patent: Apr. 14, 2020

(54) STRUCTURED THERMOPLASTIC IN COMPOSITE INTERLEAVES

(71) Applicant: Hexcel Composites Limited, Duxford (GB)

(72) Inventors: Stephen Mortimer, St. Ives (GB); John Cawse, Tavistock (GB)

(73) Assignee: HEXCEL COMPOSITES, LTD., Duxford, Cambridge (GB)

( * ) Notice: Subject to any disclaimer, the term of this patent is extended or adjusted under 35 U.S.C. 154(b) by 55 days.

(21) Appl. No.: 16/108,640

(22) Filed: Aug. 22, 2018

(65) Prior Publication Data
US 2018/0361682 A1    Dec. 20, 2018

Related U.S. Application Data

(60) Continuation-in-part of application No. 14/884,484, filed on Oct. 15, 2015, now Pat. No. 10,065,393.
(Continued)

(30) Foreign Application Priority Data

Mar. 25, 2006 (GB) .................................. 0606045.3
May 27, 2010 (GB) .................................. 1008884.7

(51) Int. Cl.
*B29C 70/02* (2006.01)
*B29C 70/08* (2006.01)
(Continued)

(52) U.S. Cl.
CPC ............ *B29C 70/025* (2013.01); *B29B 15/12* (2013.01); *B29C 70/086* (2013.01); *B32B 5/00* (2013.01); *C08J 5/24* (2013.01); *B29C 70/48* (2013.01)

(58) Field of Classification Search
CPC .. B32B 5/26; B32B 5/12; B32B 27/34; B32B 27/281; B32B 27/296; B32B 27/38
See application file for complete search history.

(56) References Cited

U.S. PATENT DOCUMENTS 3,095,607 A    7/1963  Cobb
4,539,253 A    9/1985  Hirschbuehler et al.
(Continued)

FOREIGN PATENT DOCUMENTS

EP    0274899    7/1988
EP    327142     8/1989
(Continued)

OTHER PUBLICATIONS

English translation of JP H04-292909—Mitsubishi Rayon—Oct. 26, 1992.
(Continued)

*Primary Examiner* — Michael M Dollinger
(74) *Attorney, Agent, or Firm* — W. Mark Bielawski; David J. Oldenkamp

(57) ABSTRACT

One or more layers of structured thermoplastic polymer are located within the interleaf zones of a preform or prepreg. The structured thermoplastic polymer is a film or membrane formed by: a) dissolving polyethersulfone or polyetherimide in a solvent to form a polymer dope; b) dispersing a curing agent for an epoxy resin in the polymer dope to form a curative-enriched polymer dope; c) casting the curative-enriched polymer dope onto a surface to form a dope layer; and d) removing the solvent from the dope layer to form a layer of structured thermoplastic polymer.

7 Claims, 3 Drawing Sheets

Related U.S. Application Data which is a continuation of application No. 13/699,035, filed as application No. PCT/IB2011/000728 on Apr. 4, 2011, which is a continuation-in-part of application No. 14/133,965, filed on Dec. 19, 2013, now Pat. No. 9,492,971, which is a division of application No. 12/225,280, filed as application No. PCT/GB2007/001079 on Mar. 23, 2007.

(51) Int. Cl.
*C08J 5/24* (2006.01)
*B29B 15/12* (2006.01)
*B32B 5/00* (2006.01)
*B29C 70/48* (2006.01)

(56) References Cited

U.S. PATENT DOCUMENTS

| | | | |
|---|---|---|---|
| 4,868,050 A | 9/1989 | Tanaka | |
| 4,919,810 A | 4/1990 | Itoh et al. | |
| 5,028,478 A | 7/1991 | Odagiri | |
| 5,141,804 A | 5/1992 | Riefler et al. | |
| 5,288,547 A | 2/1994 | Elmes et al. | |
| 5,389,435 A | 2/1995 | Yap | |
| 5,770,313 A * | 6/1998 | Furumoto | B29C 70/086 428/411.1 |
| 6,242,093 B1 | 6/2001 | Ferguson | |
| 6,287,696 B1 | 9/2001 | Noda et al. | |
| 6,995,099 B1 | 2/2006 | Nishimura et al. | |
| 7,709,404 B2 | 5/2010 | Kruger et al. | |
| 7,754,322 B2 | 7/2010 | Tilbrook et al. | |
| 8,084,120 B2 | 12/2011 | Hill et al. | |
| 9,427,917 B2 | 8/2016 | Beraud et al. | |
| 2004/0041128 A1 | 3/2004 | Carter et al. | |
| 2005/0059309 A1 | 3/2005 | Tsotsis | |
| 2005/0197026 A1 | 9/2005 | Keuchel et al. | |
| 2005/0257887 A1 | 11/2005 | Tsotsis | |
| 2006/0048881 A1 | 3/2006 | Evans et al. | |
| 2006/0252334 A1 | 11/2006 | LoFaro et al. | |
| 2007/0190880 A1 | 8/2007 | Dubrow et al. | |
| 2008/0064279 A1 | 3/2008 | Brown et al. | |
| 2008/0260954 A1 | 10/2008 | Paton | |
| 2008/0277057 A1 | 11/2008 | Montgomery et al. | |
| 2010/0178487 A1 | 7/2010 | Arai et al. | |
| 2010/0228001 A1 | 9/2010 | Mortimer | |
| 2011/0159764 A1 | 6/2011 | Price et al. | |
| 2011/0174522 A1 | 7/2011 | Simmons | |
| 2011/0218272 A1 | 9/2011 | Numata | |
| 2012/0164445 A1 | 6/2012 | Boyle et al. | |

FOREIGN PATENT DOCUMENTS

| | | |
|---|---|---|
| EP | 0366979 | 5/1990 |
| EP | 0487868 | 6/1992 |
| EP | 0496518 | 7/1992 |
| EP | 1338406 | 8/2003 |
| EP | 1473132 | 3/2004 |
| EP | 1588838 | 10/2005 |
| EP | 2067592 | 6/2009 |
| FR | 2937583 A1 | 4/2010 |
| JP | 01320146 | 12/1989 |
| JP | H04-292909 | 10/1992 |
| JP | H08-259713 | 10/1996 |
| WO | 99-038683 | 8/1999 |
| WO | 2000/58083 A1 | 11/2000 |
| WO | 2007-110617 | 10/2007 |
| WO | 08-040963 | 4/2008 |

OTHER PUBLICATIONS

English translation of JP H08-259713—(Apr. 17, 2008)—Toray Industries—Oct. 8, 1996.
Definition of Polysulfone, Knovel, Hawley's Condensed Chemical Dictionary, 14th Edition, 2002, John Wiley & Sons, Inc.

* cited by examiner

STRUCTURED THERMOPLASTIC IN COMPOSITE INTERLEAVES

This application is a continuation-in-part of U.S. Ser. No. 14/884,484, filed on Oct. 15, 2015, which is a continuation-in-part of U.S. Ser. No. 13/699,035, filed on Nov. 20, 2012, which is a 371 of PCT/IB2011/000728 filed on Apr. 4, 2011, and which also is a continuation-in-part of U.S. Ser. No. 14/133,965, filed Dec. 19, 2013, now U.S. Pat. No. 9,492,971, issued Nov. 15, 2016, which is a divisional of U.S. Ser. No. 12/225,280, filed Sep. 17, 2008, which is 371 of PCT/GB2007/001079, filed Mar. 23, 2007.

BACKGROUND OF THE INVENTION

1. Field of the Invention

The present invention relates to thermoplastic toughening materials for use in composite assemblies. The present invention also relates to preforms which are infused with thermosetting resin and to prepreg comprising fibres and thermosetting resin, both of which are cured to form a composite material. More particularly, one embodiment of the present invention involves the use of a polyethersulfone film or membrane as a structured thermoplastic material that is present in the laminate interleaves of the composite material.

2. Description of Related Art

Composite materials made from a polymeric matrix and a reinforcing fibrous material are used in many commercial applications including aerospace, sports goods, transportation, civil engineering and energy generation. Some of the most commonly used composites are made from thermosetting resins with glass or carbon-fibre reinforcement. Epoxy resin are the most extensively used class of matrix polymers for high performance applications, followed by phenolics, cyanate esters, bismaleimides, benzoxazines and several less familiar chemistries. These combinations of fibre and curable polymeric matrix resins are used in an increasing variety of processes, according to the requirements of the specific application. Particularly convenient ways of utilizing composites are prepreg, semi-preg, resin transfer moulding (RTM), vacuum assisted resin transfer moulding (VaRTM), liquid resin infusion (LRI), resin film infision (RFI), pultrusion, pressure assisted moulding and several variants thereof.

The choice of a specific type of composite process is influenced by many factors including cost, convenience, complexity of the part to be made, health and safety considerations and mechanical performance requirements, In general, the highest performance can be achieved by the judicious assembly of layers of prepreg. This is a labour intensive operation and it is preferable to use RTM or some other resin injection or infusion method. In RTM, an infusible structure (or preform) is made from reinforcing fibres and other additive including binders, and the preform is injected or infused with liquid resin and the resin is cured at elevated temperature to form a useable component.

Prepregs, comprising a layer of fibre impregnated with resin such as epoxy resin, are widely used in the generation of such composite materials. Typically a number of plies of such prepregs are "laid-up" as desired and the resulting laminate is cured, typically by exposure to elevated temperatures, to produce a cured composite laminate.

However, although such cured materials have a number of clear benefits, it has long been known that they can suffer from poor impact resistance and be prone to delamination. This is particularly the case when epoxy resin systems are used, which are known to tend to produce cured systems with low toughness.

A widely employed method of improving the toughness of such arrangements is for the laminate of a plurality of prepreg fibre layers to be interleafed with resin layers. Commonly such resin interleaf layers also comprise a distribution of thermoplastic toughener particles. This arrangement has been shown to increase the toughness of the laminate without having a detrimental effect on other aspects of the laminate.

Laminates that have interleaf layers toughened with thermoplastic particles are typically cured under autoclave conditions, where the high temperatures, and more importantly the high pressures, are generally required to provide cured laminates that meet the particularly exacting mechanical specifications required for structural applications.

A widely used alternative to autoclave cure is the so-called vacuum bag or out-of-autoclave cure. This utilizes a vacuum and relies on atmospheric pressure to press down onto the laminate during cure. Although much more economical than autoclave curing, the maximum pressure applicable in out-of-autoclave curing is atmospheric pressure. Laminates that have interleaf layers toughened with thermoplastic particles have typically not been cured outside of an autoclave because curing at atmospheric pressure or below tends to produce cured laminates that have unacceptable mechanical properties for many structural applications including aerospace structural applications.

It would therefore be desirable to develop a prepreg which could be used to produce laminates that can be cured, either inside or outside of an autoclave, to provide composite parts that are sufficiently tough to be suitable for structural application including aerospace structural applications.

Manufacture of composite assemblies falls into two broad categories, namely direct and indirect. Direct manufacture allows a cured composite assembly to be produced without intermediate product being formed. In contrast, indirect manufacture produces an intermediate prepreg which may be partially cured. The cured composite assembly is then produced off-line.

Whilst prepregs remain important to the industry, there is a general move towards direct manufacturing processes such as RTM and RFI. Direct processes are generally preferred as the problems associated with the storage of prepregs are eliminated. Furthermore, direct processes reduce waste and reduce both manufacturing times and costs as the need for an extra impregnation step is eliminated. Direct processes also allow more complex composite parts to be manufactured.

SUMMARY OF THE INVENTION

The present invention seeks to provide a film or membrane which finds utility in both direct and indirect manufacturing processes, wherein said film or membrane serves to toughen the composite assembly of which it forms a part. The invention has particular, but not exclusive application in direct manufacturing processes for composites, such as RTM and RFI.

According to one aspect of the present invention, there is provided a non-fibrous membrane or film, as embodied in Example 8, comprising at least one soluble thermoplastic polymeric material, said material being at least partially soluble in a monomer and insoluble in a polymer derived from the monomer.

In accordance with another aspect of the present invention, uncured laminates are provided where an uncured thermosetting resin and a plurality of fibrous layers are combined such that the fibrous layers are separated by an interleaf zone located between adjacent fibrous layers. As a feature of the invention, one or more layers of structured thermoplastic polymer, such as a film or membrane, veil of thermoplastic fibers or other similar open-structured sheet, are located within one or more of the interleaf zones. The layers of structured thermoplastic polymer are from 0.5 to 50 microns thick and have a weight per unit area of from 1 to 20 grams per square meter.

The use of one or more layers of structured thermoplastic polymer in the interleaf zone not only toughens the cured laminate, but also provides a number of advantages over the conventional use of thermoplastic particles as the interleaf toughening agent. For example, it was discovered that the use of one or more layers of structured thermoplastic polymer as the interleaf toughening agent gives one the option to cure the laminate at relatively low pressures without reducing toughness, as is the case with particulate interleaf tougheners. In addition, two layers of different structured thermoplastic polymers may be located within a single interleaf zone to provide a structured orientation of different thermoplastic polymers that is not possible with a mixture of randomly oriented dissimilar particles. Further, use of structured thermoplastic polymers in the interleaf zone eliminates the problems associated with particulate tougheners that may include some particles that migrate during cure to locations, both inside and outside of the interleaf zone, where their effectiveness may be reduced.

The invention covers the prepreg that is used to make uncured laminates where one or more layers of structured thermoplastic are located within the laminate interleaf zones. Such prepreg include those where the fibrous layer is sandwiched and held between layers of structured thermoplastic and those where one or more layers of structured thermoplastic polymer are located on one side of the fibrous layer.

The invention covers methods for making prepreg and methods for using the prepreg to make laminates. In addition, methods for making cured parts from the prepreg and laminates, as well as the final cured parts, are also covered by the invention.

In one aspect, the invention relates to a prepreg comprising a structural layer of fibres and an open-structured sheet, the prepreg being impregnated with curable resin comprising thermosetting resin. Another aspect of the invention involves preforms that comprise structural layers of fibres and layers of structured thermoplastic polymer.

Such a prepreg, taken alone or when laid together with a plurality of similar prepregs and cured forms a composite laminate having excellent toughness properties, even when the convenient out-of-autoclave cure cycle is employed, and can also achieve the high fibre volumes required in structural applications.

The improved prepregs of the present invention may be used in a wide variety of applications where a lightweight but structurally tough laminate is needed. However, they are particularly useful in aerospace applications, where the technical requirements are particularly exacting.

The above described and many other features and attendant advantages of the present invention will become better understood by reference to the following detailed description when taken in conjunction with the accompanying drawings.

DETAILED DESCRIPTION OF THE INVENTION

The prepreg and laminates of the present invention may be used in place of existing prepreg and laminates where thermoplastic particles, which are insoluble in the resin matrix, are located in the interleaf between fibre plies to increase the damage tolerance of the cured composite part. Such prepreg and laminates are used to form interleaf-toughened composite parts for structural applications in the aerospace industry and in any other application where high structural strength and damage tolerance is required. The present invention involves substituting one or more layers of structured thermoplastic polymer or open-structured sheet into the laminate interleaf zone in place of the thermoplastic particles to provide a number of advantages that are not possible using thermoplastic particles. Accordingly, the present invention may be applied to any of the known manufacturing and curing processes where thermoplastic particles are located in the laminate interleaf as a toughening agent.

The structured layers of thermoplastic polymer are preferably used as a replacement for substantially all (95 weight percent or more) of the thermoplastic particles that would otherwise be placed in the interleaf zones of the laminate. However, mixed systems are possible where thermoplastic particles and structured thermoplastic layers are combined in the interleaf zone. Preferably, the majority (50 weight percent or more) of the insoluble thermoplastic in the interleaf zone will be in the form of one or more structured layers of thermoplastic polymer.

Figure 1:
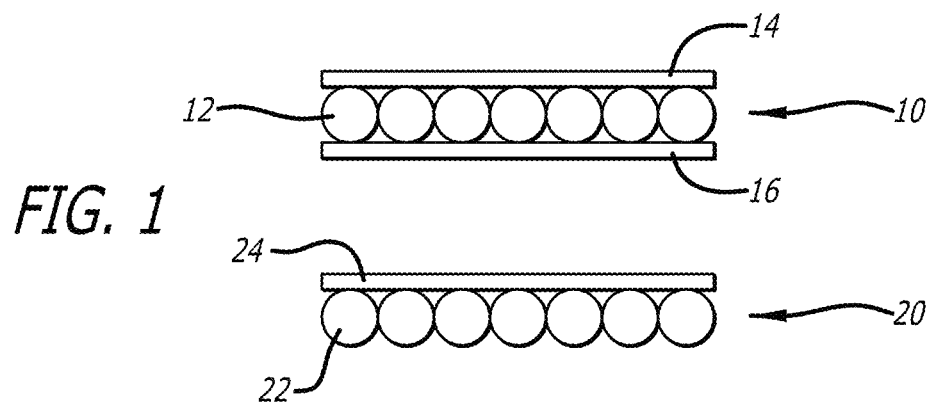
FIG. 1 is a simplified cross-sectional view of two exemplary types of prepreg in accordance with the present invention.

A simplified cross-sectional view of a preferred exemplary prepreg is shown at 10 in FIG. 1. The prepreg 10 includes a single layer of unidirectional fibres 12 which is sandwiched between two layers of structured thermoplastic polymer, such as polyamide veils 14 and 16. The prepreg 10 includes a thermosetting resin, which may be included as one or more layers (not shown) or it can be infused or impregnated throughout all or part of the prepreg 10.

A simplified cross-sectional view of a second preferred exemplary prepreg is shown at 20 in FIG. 1. The prepreg 20 includes a single layer of unidirectional fibres 22 and a single layer of structured thermoplastic polymer, such as polyamide veil 24. The prepreg 20 includes a thermosetting resin, which may be included as one or more layers (not shown) or it can be infused or impregnated throughout all or part of the prepreg 20.

Figure 2:
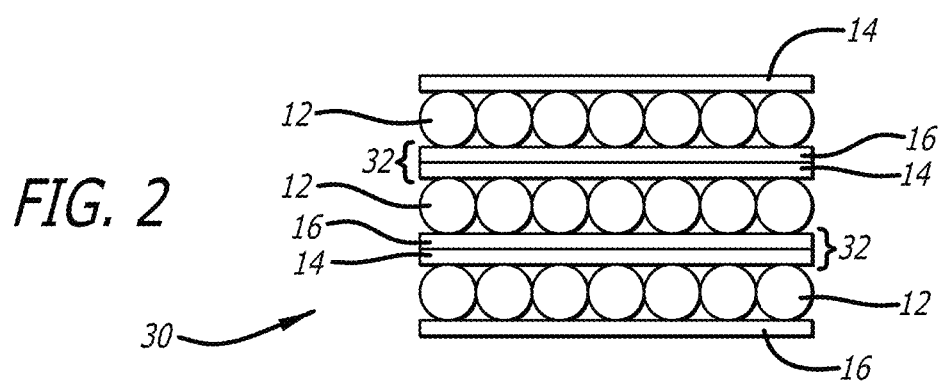
FIG. 2 is a simplified cross-sectional view of an exemplary laminate made from one of the exemplary prepregs shown in FIG. 1.

An exemplary laminate is shown at 30 in FIG. 2 where three layers of prepreg 10 have been stacked to form a 3-layer laminate where there are two structured thermoplastic polymer layers 14 and 16 located in the interleaf zones 32 located between each fibrous layer 12. Another exemplary laminate is shown at 40 in FIG. 2 where three layers of prepreg 20 have been stacked to form a 3-layer laminate where there is one structured thermoplastic polymer layer 24 located in the interleaf zones 42 located between each fibrous layer 22. Only three layers are shown in the figures for demonstrative purposes. The laminate may include many more layers depending upon the design parameters for the particular composite part being made. In addition, two or more layers of structured thermoplastic polymer may be used in place of the single structured layers shown at 14, 16 and 24. Typical laminates comprise from 4 to 200 layers of structural fibres with most or all of the layers separated by a curable thermosetting resin interleaf layer. Suitable interleaf arrangements are disclosed in EP0274899.

The material that is used to form the structured thermoplastic polymer layers 14, 16 and 24 must meet a number of criteria in order for the layers to function properly as a replacement for the insoluble thermoplastic particles that previously have been used in the interleaf zones. The structured polymer layers can be made from the same thermoplastic polymers that have been used to make thermoplastic toughening particles. In general, the thermoplastic must be insoluble in the matrix resin (typically an epoxy) at room temperature and at the elevated temperatures used to cure the resin. Depending upon the melting point of the thermoplastic polymer, it may melt or soften to varying degrees during curing at elevated temperatures and re-solidify as the cured laminate is cooled. Suitable thermoplastics for use in making the structured layer should not dissolve in the resin, as is the case with epoxy-soluble thermoplastics, such as polyethersulfone (PES) and polyetherimide (PEI).

Suitable examples of thermoplastic polymers that may be used to form the structured polymer layers are polyamides (PA), copolyamides (CoPA), ether or ester block polyamides (PEBAX, PEBA), polyphthalamide (PPA), polyesters such as polyethylene terephthalate (PET) and polybutylene terephthalate (PBT), copolyesters (CoPE), thermoplastic polyurethanes (TPU), polyacetals, polyolefins, polyphenylenes sulfones, polyetheretherketones (PEEK), polyetherketoneketone (PEKK), poly(phenylene sulfate) (PPS), thermoplastic polyimides (PI), polyamideimide, liquid crystal polymers (LCP), block copolymers such as styrene-butadiene-methylmethacrylate (SBM) copolymers, methylmethacrylate-acrylate of butyl-methylmethacrylate (MAM) copolymers.

Polyamides and copolyamides are the preferred thermoplastic materials for the structured thermoplastic layers. Particles made from polyamides and copolyamides have been a used as interleaf toughening particles in the past (See U.S. Pat. No. 7,754,322 and published U.S. Patent Application No. 2010/0178487A1). Polyamides come in a variety of types, such as caprolactame (PA6), laurolactame (PA12), copolymers of PA6 and PA12, as well as PA 10 and 11. Any of the polyamides that are suitable for making particles that are used to toughen laminate interleaf zones are also suitable for use in making layers of structured thermoplastic polymer in accordance with the present invention.

Structured polyamide layers will have different melting temperatures depending upon the particular polyamides used to make the layer, the degree of copolymerization of the polyamide and the degree of crystallinity. For example, polyamide layers that contain mostly polyamide 6 will typically have a melting point of above 190° C. Polyamide layers made from PA6 alone will typically have melting points on the order of 213° C., whereas structured layers made from a copolymer of 80 weight percent PA6 and 20 weight percent PA 12 will have melting points on the order of 194° C. When the polyamide copolymer contains 20 weight percent PA6 and 80 weight percent PA12, the melting point drops to around 160° C. Structured polyamide layers made from PA12 alone typically have even lower melting points.

As an advantage of the present invention, the structured thermoplastic layers 14 and 16 or 24 may be made from different types of polyamides. This allows one to mix and match layers of polyamide, or other suitable thermoplastic polymer, within the interleaf zones of the laminate. Since the thermoplastic layers are structured, the placement of each particular type of polyamide can be carefully controlled. This type of directed polyamide placement is not possible with polyamide particles where a mixture of different particle types results in a homogenous blend within the interleaf zone.

As an example, thermoplastic polymer layer 14 would be a veil of PA6/PA12 copolymer fibers and thermoplastic polymer layer 16 would be a veil of PA12 fibers. The resulting laminate 30 would include interleaf zones 32 in which discreet layers of PA6/PA12 and PA112 are located. There are many other combinations possible depending upon the desired number of different thermoplastic polymers, the number of layers placed in each interleaf zone, the orientation and order of prepreg stacking to form the laminate and the orientation of the thermoplastic layers in the prepreg.

The structured thermoplastic polymer layers must be in a physical form that allows them to be substituted in place of particles in the interleaf zone. In particular, the layers must be sufficiently thin to fit within the interleaf zone and the density of the layer must be such that the appropriate amount or concentration of thermoplastic material is present in the interleaf zone to impart the desired amount of damage tolerance. Interleaf zones in cured high strength structural laminates typically have a thickness that ranges from 10 to 100 microns. Preferred interleaf zones range in mean thickness from 15 microns to 50 microns.

The structured thermoplastic layer should have a thickness that allows it to fit within the above interleaf zones along with a thermosetting resin. When more than one structured thermoplastic layer is to be located within an interleaf zone, as is the case with the laminate shown in FIG. 2, the combined thickness of the layers should be less than the desired interleaf zone thickness of the cured laminate. The thickness of the structured layer(s) should be no more than 95 percent of the desired interleaf zone thickness. Preferably, the thickness of the structured layer(s) will not be more than 75 percent of the desired interleaf zone thickness.

The thickness of the structured thermoplastic layers should be from 0.5 microns to 50 microns. The actual thickness for each layer will be determined by the intended thickness of the interleaf zone in the cured laminate, the number of layers desired in each interleaf zone, the density of the structured thermoplastic layer and the amount (concentration) of thermoplastic polymer that is desired within each interleaf zone. The preferred thickness range for the structured thermoplastic layers is from 2 microns to 35 microns and most preferably from 3 microns to 20 microns.

The density of the structured thermoplastic layer must be such that it provides the desired amount (concentration) of thermoplastic toughener to the interleaf zone. The needed density for the layer is directly dependent upon the thickness of the layer being used. The thinner the layer, the denser the layer must be in order to provide the same concentration of thermoplastic toughener in the interleaf zone. The density of the structured thermoplastic layer should be such that it provides a structured layer that has an areal weight of 1 to 20 grams per square meter (gsm) for layers that range from 0.5 to 50 microns in thickness. For preferred thermoplastic layers that are 2 to 35 microns thick, it is preferred that the density of the thermoplastic layer be such that the areal weight of the layer is from 2 gsm to 10 gsm. For layers that are from 3 to 20 microns thick, the density of the layer should be such that the areal weight of the layer is from 2 gsm to 8 gsm.

Figure 4:
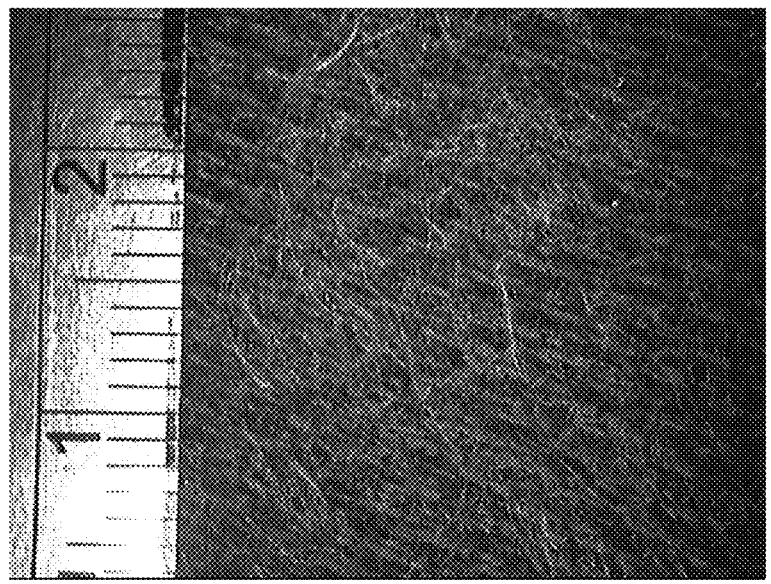
FIG. 4 is a top view of a preferred exemplary thermoplastic veil for use in the laminate interleaf in accordance with the present invention (scale=cm).
Figure 5:
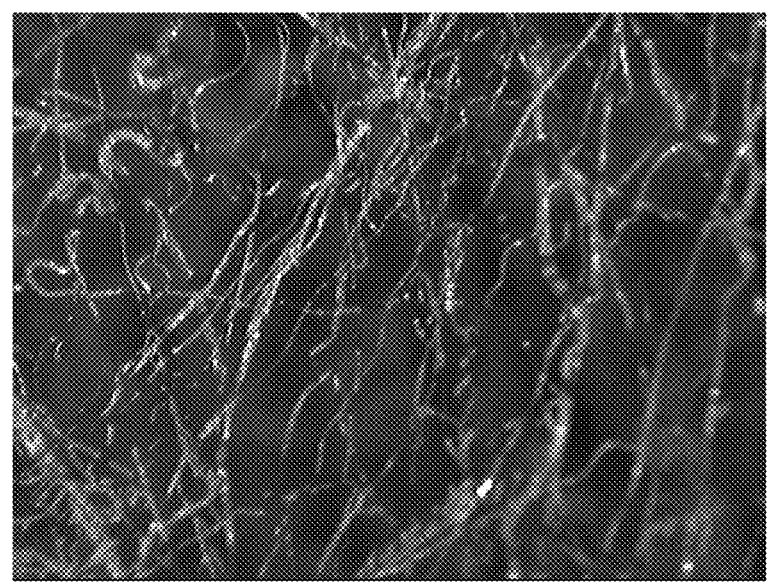
FIG. 5 is a magnified (80×) top view of the preferred exemplary thermoplastic veil shown in FIG. 4.

Structured thermoplastic polymer layers having the required combination of thickness and areal weight are available commercially in the form of spunlaced and random fibrous veils. Woven fabric or scrim is generally not suitable due to the relatively lightweight and thin structure required for the structured thermoplastic layer. Thin solid or porous films are also not preferred. An exemplary lightweight (4 gsm) fibrous veil is shown in FIG. 4 and FIG. 5 (80× magnification). The veil is made from randomly oriented PA12 fibers and is available as 128D04 Nylon veil from Protechnic (Cernay, France). Another suitable nylon veil is 128D06 Nylon veil, which is a 6 gsm PA12 fibrous veil that is also available from Protechnic.

Fibrous veil of the type shown in FIGS. 4 and 5 are generally classified by the percentage of openness. For example, 128D04 Nylon fibrous veil has an openness of 70 percent. The heavier 128D06 Nylon fibrous veil has an openness of 50 percent. The structured thermoplastic polymer layer should have an openness of between 30 percent to 98 percent, preferably from 50 percent to 95 percent and more preferably from 60 percent to 90 percent. This percentage of openness is required in order to provide free passage of resin through the structured thermoplastic to insure complete mixing of the resin with the thermoplastic fibers. This is particularly important since the thermoplastic fibers do not dissolve in the resin during cure.

The structured thermoplastic layer may also be viewed as an open-structured sheet that is an integral sheet held together by interconnecting and/or overlapping fibres. Such fibres may be woven, knitted, also be random e.g. spunlaced or laid scrim, although non-woven, e.g. random is preferred. Such a sheet is often referred to in the art as a veil.

The open-structured sheet may be characterized by the degree of openness of the sheet, i.e. the percentage of average surface area of the sheet which is made up of open holes in the sheet as determined on an area basis by image analysis of micrographs. The open-structured sheets of the present invention typically have a degree of openness of from 30% to 98%, preferably from 50% to 95%, more preferably from 60% to 90%. This helps to maintain a lightweight sheet and also allows the free passage of resin.

Figure 3:
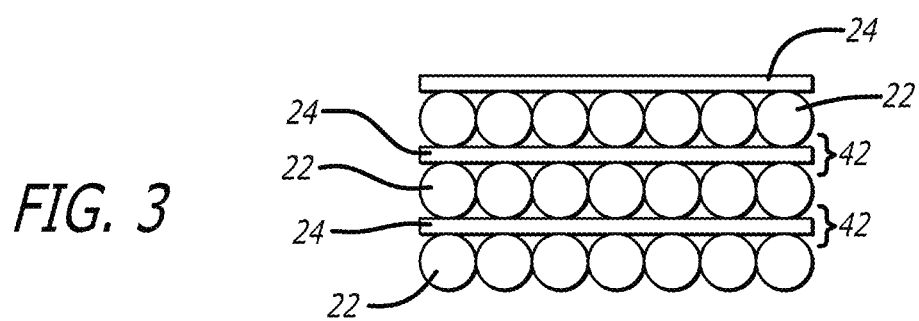
FIG. 3 is a simplified cross-sectional view of an exemplary laminate made from one of the exemplary prepregs shown in FIG. 1.

The structural fibres 12 or 22 may be in the form of random, knitted, non-woven, multiaxial or any other suitable pattern. For structural applications, it is generally preferred that the fibres be unidirectional in orientation as shown in FIGS. 1-3. The laminates in FIGS. 2 and 3 show the various layers of unidirectional fibres oriented in the same direction. This is only one of many possible orientations for stacks of unidirectional fibre layers. For example, unidirectional fibres in neighboring layers may be arranged orthogonal to each other in a so-called 0/90 arrangement, which signifies the angles between neighboring fibre layers. Other arrangements, such as 0/+45/−45/90 are of course possible, among many other arrangements. The laminates shown in FIGS. 2 and 3 are in a 0/0/0 orientation. When unidirectional fibre layers are used, the orientation of the fibre will typically vary throughout the laminate stack.

The structural fibres 12 or 22 may comprise cracked (i.e. stretch-broken), selectively discontinuous or continuous fibres. The structural fibres may be made from a wide variety of materials, such as carbon, graphite, glass, metalized polymers, aramid and mixtures thereof. Carbon fibres are preferred. Typically the fibres in the structural layer will generally have a circular or almost circular cross-section with a diameter in the range of from 3 to 20 μm, preferably from 5 to 12 μm.

Exemplary layers of unidirectional fibres are made from HexTow® carbon fibres, which are available from Hexcel Corporation (Dublin, Calif.). Suitable HexTow® carbon fibres for use in making unidirectional fibre layers include: IM7 carbon fibres, which are available in fibres that contain 6,000 or 12,000 filaments and weigh 0.223 g/m and 0.446 g/m, respectively; IM8-IM10 carbon fibres, which are available in fibres that contain 12,000 filaments and weigh from 0.446 g/m to 0.324 g/m; and AS7 carbon fibres, which are available in fibres that contain 12,000 filaments and weigh 0.800 g/m.

An added advantage of the invention is that the structured thermoplastic may be used to hold dry unidirectional fiber together so that it can be processed using relatively simple prepreg processing equipment, such as that used for making fabric prepreg by film transfer where the fibre handling aspect of the machine is much simpler than typical unidirectional fiber prepreg machines.

As a feature of the present invention, it was discovered that the lightweight fibrous veils and other similar structured thermoplastic layers that can be used as a substitute for thermoplastic interleaf toughening particles, also provide an effective means for holding unidirectional fibre layers together during handling prior to prepreg formation or other resin infusion. The fibrous veils function both as a temporary holding system for the unidirectional fibres and as thermoplastic toughening agent for the cured laminate.

It is preferred that the fibrous veil and similar structured thermoplastic layer be selected so that it provides the desired level of stability to the unidirectional fibre layers during initial handling of the dry unidirectional fibers and that it also provides the desired level of laminate interleaf toughening. It was found that the sandwich configuration shown at 10 in FIG. 1 is a preferred orientation for achieving these two goals. The location of a single lightweight fibrous veil on either side of dry unidirectional fibres was found to provide sufficient holding power to keep the dry unidirectional fibres together during handling. When the laminate was formed (FIG. 2), the single layers of fibrous veil located on opposite sides of the unidirectional fibre layer were combined in the interleaf zone 32 to form a double layer of fibrous thermoplastic material. This double layer of fibrous thermoplastic material was found to provide a sufficient amount of thermoplastic in the interleaf zone to provide desired levels of laminate toughening.

The two layers of fibrous veil are made from randomly oriented thermoplastic fibres. Accordingly, they are preferably attached to the dry unidirectional fibers by partially melting or softening the veils and simultaneously pressing the veils against the unidirectional fibres. The partially melted/softened fibres bond to the unidirectional fibre layer and provide stabilization of the layer when the veils are cooled back below their melting temperatures. The stabilized dry unidirectional fibre layer or tape is then ready for handling or storage prior to addition of resin to form the prepreg 10. This type of sandwich configuration is useful in situations where the addition of resin to form the prepreg is to take place at a later time or different location.

Fibrous veils of thermoplastic material, which have the properties set forth above, are uniquely suited and preferred for use in accordance with the present invention. When appropriately placed, they are able to function as both a substitute for conventional stabilization systems for dry unidirectional fibres and as a substitute for thermoplastic particles used to toughen laminate interleaf zones. Appropriate placement is required in order to achieve the above-described holding function. For example, it was found that a single layer of fibrous veil of the type suitable for use as an interleaf toughener, when bonded to only one side of dry unidirectional fibres, is not sufficient to hold the dry fibres together during subsequent handling of the dry fibres. Accordingly, it is necessary to provide additional support to the dry unidirectional fibres or employ a process where the resin and fibrous veil are simultaneously applied to the unidirectional fibers to form a prepreg of the type shown at 20.

Typically the fibres 12 and 22 of the prepregs 10 and 20, respectively, will be substantially impregnated with a thermosetting resin (not shown). For example, prepregs with a resin content of from 30 to 45 wt % of the total prepreg weight are preferred. The prepregs of the present invention are predominantly composed of resin and structural fibres. Typically the prepreg comprises from 25 to 50 wt % of curable resin. Additionally the prepregs typically comprise from 45 to 75 wt % of structural fibres.

The resin in the prepreg is also preferably present in an amount that forms a resin-rich region on the surface of the prepreg that is an essentially fibre-free layer adjacent to the structural fibre layer. When a plurality of such prepregs is laid together, the fibre-free resin layers form the interleaf layers between the structural fibre layers.

As discussed above, the prepregs according to the invention are intended to be laid up with other prepregs, to form a curable stack of prepregs. Thus, one aspect, the invention relates to a curable stack of prepregs, the stack comprising a plurality of layers of structural fibres and a plurality of curable thermosetting resin interleaf layers substantially free of structural fibres, wherein at least one interleaf layer comprises at least one structured thermoplastic layer. Typically, most of the interleaf layers will comprise a structured thermoplastic layer or open-structured sheet. In a preferred embodiment at least half of the interleaf layers comprise an open-structured sheet. It may even be desirable for at least 75% of the interleaf layers to comprise such a sheet, or even substantially all of the interleaf layers as shown in FIGS. 2 and 3.

Typically, the fibres in the prepreg stack will be substantially impregnated with the resin. For example, prepreg stacks with a resin content of from 30 to 45% of the total weight of the prepreg stack or laminate are preferred.

As discussed above, in the eventual cured composite laminate, the open-structured polymeric sheet is located at or in the interleaf layer. However, during the heating stage prior to cure, the thermosetting resin has a reduced viscosity which tends to encourage the movement of the open-structural sheet into the interleaf layer. Thus, it is only necessary in the prepreg or prepreg stack for the open-structured sheet to be in contact with the resin layer, and not necessarily embedded therein.

It has been found that the improvements in toughness can be achieved even though the structured thermoplastic polymer layer or open-structured sheet is very lightweight. This is particularly important for aircraft structural applications. Thus, open-structured sheets having weights per unit area in accordance with the present invention, as set forth above, are particularly well-suited for aerospace applications.

In the preferred embodiment shown at 10, the prepreg comprises two open-structured sheets located on either side of the structural layer of fibres. This can aid in handling the prepreg, particularly prior to resin impregnation and can provide further increases in toughness. Preferably the two sheets are substantially identical. However, they may also be made from different thermoplastic polymers to provide specific targeting of different toughening agents within the interleaf zone.

The prepreg and prepreg stack of the present invention typically comprise a very low quantity of entrapped gas so that the degree of resin impregnation in the interstices of the structural fibres is high. Thus, they preferably have a water pick-up value of less than 9%, more preferably less than 6%, most preferably less than 3%. The water pick-up test is well known in the art and involves immersing an edge of a small piece of unidirectional prepreg into water.

The prepreg is intended to be laid-up with other composite materials (e.g. other prepregs according to the invention or otherwise) to produce a curable laminate or prepreg stack according to the present invention.

The prepreg is typically produced as a roll of prepreg and in view of the tacky nature of such materials, a backing sheet is generally provided to enable the roll to be unfurled at the point of use. Thus, preferably the prepreg according to the invention comprises a backing sheet on an external face.

The curable resin may be selected from epoxy, isocyanate, benzoxazine, bismaleimide and acid anhydride, for example. Preferably the curable resin is an epoxy resin.

Suitable epoxy resins may comprise monofunctional, difunctional, trifunctional and/or tetrafunctional epoxy resins.

Suitable difunctional epoxy resins, by way of example, include those based on; diglycidyl ether of bisphenol F, diglycidyl ether of bisphenol A (optionally brominated), phenol and cresol epoxy novolacs, glycidyl ethers of phenol-aldelyde adducts, glycidyl ethers of aliphatic diols, diglycidyl ether, diethylene glycol diglycidyl ether, aromatic epoxy resins, aliphatic polyglycidyl ethers, epoxidized olefins, brominated resins, aromatic glycidyl amines, heterocyclic glycidyl imidines and amides, glycidyl ethers, fluorinated epoxy resins, glycidyl esters or any combination thereof.

Difunctional epoxy resins may be preferably selected from diglycidyl ether of bisphenol F, diglycidyl ether of bisphenol A, diglycidyl dihydroxy naphthalene, or any combination thereof.

Suitable trifunctional epoxy resins, by way of example, may include those based upon phenol and cresol epoxy novolacs, glycidyl ethers of phenol-aldehyde adducts, aromatic epoxy resins, aliphatic triglycidyl ethers, dialiphatic triglycidyl ethers, aliphatic polyglycidyl ethers, epoxidised olefins, brominated resins, triglycidyl aminophenyls, aromatic glycidyl amines, heterocyclic glycidyl imidines and amides, glycidyl ethers, fluorinated epoxy resins, or any combination thereof. Suitable trifunctional epoxy resins are available from Huntsman Advanced Materials (Monthey, Switzerland) under the tradenames MY0500 and MY0510 (triglycidyl para-aminophenol) and MY0600 and MY0610 (triglycidyl meta-aminophenol). Triglycidyl meta-aminophenol is also available from Sumitomo Chemical Co. (Osaka, Japan) under the tradename ELM-120.

Suitable tetrafunctional epoxy resins include N,N, N',N'-tetraglycidyl-m-xylenediamine (available commercially from Mitsubishi Gas Chemical Company under the name Tetrad-X, and as Erisys GA-240 from CVC Chemicals), and N,N,N',N'-tetraglycidylmethylenedianiline (e.g. MY 0720 and MY0721 from Huntsman Advanced Materials). Other suitable multifunctional epoxy resins include DEN 438 (from Dow Chemicals, Midland, Mich.), DEN 439 (from Dow Chemicals), Araldite ECN 1273 (from Huntsman Advanced Materials), and Araldite ECN 1299 (from Huntsman Advanced Materials).

The curable resin may also comprise one or more curing agent. Suitable curing agents include anhydrides, particularly poly carboxylic anhydrides; amines, particularly aromatic amines e.g. 1,3-diaminobenzene, 4,4'-diaminodiphenylmethane, and particularly the sulphones and methylene bisanilines, e.g. 4,4'-diaminodiphenyl sulphone (4,4' DDS), and 3,3'-diaminodiphenyl sulphone (3,3' DDS), 4,4'-methylenebis (2-methyl-6-isopropylaniline (M-MIPA), 4,4'-methylenebis (3-chloro-2,6-diethylene aniline (M-CDEA), 4,4'-methylenebis (2,6 diethyleneaniline) (M-DEA) and the phenol-formaldehyde resins. Preferred curing agents are the methylene bisanilines and the amino sulphones, particularly 4,4' DDS and 3,3' DDS.

The prepregs according to the present invention can be manufactured in a variety of ways. For example, the structural fibres may be brought into contact with the structured thermoplastic polymer layer or open-structured sheet and then, whilst in contact, are together passed to an impregnation stage where at least one layer of resin is brought into contact with an external face of the fibre and open-structured sheet (structured thermoplastic polymer layer) combination, and pressure applied to induce resin impregnation. Alternatively the open-structured sheet (structured thermoplastic polymer layer) can be applied to the resin layer, and thereafter the structural fibre layer is brought into contact with the resin and open-structured sheet (structured thermoplastic polymer layer) combination, before pressure-induced resin impregnation occurs. As a further alternative the structural layer may be resin impregnated without the open-structured sheet (structured thermoplastic polymer layer), which is subsequently laid-down onto an external surface of the resin-impregnated structural layer.

However, due to their light and delicate nature, the structured thermoplastic polymer layers or open-structured sheets used in the present invention can be difficult to handle, particularly if they are to be laid onto a tacky resin surface. Thus, it has been found to be preferable if the structured thermoplastic polymer layer is laid down onto a resin-free surface.

Thus, in another aspect, the invention relates to a process for the manufacture of a prepreg, the process comprising feeding a structural layer of fibres in contact with an adjacent structured thermoplastic polymer layer or open-structured sheet, and bringing into contact with an external face of the structural layer and/or the structured thermoplastic polymer layer (open-structured sheet) a layer of curable resin comprising thermosetting resin, and compressing the resin, fibres and sheet together, sufficient to induce at least partial resin impregnation into the interstices between the structural fibres.

As mentioned previously, it is advantageous for the structural layer of fibres to be sandwiched between two adjacent open-structured sheets (structured thermoplastic polymer layer) prior to resin impregnation, as this helps to maintain the integrity of the fibres, particularly when the structural fibres are unidirectional. In a preferred process, the fibres of the open-structured sheet are adhered to the fibres by partially melting them.

In order to increase the rate of impregnation, the process is preferably carried out at an elevated temperature so that the viscosity of the resin is reduced. However it must not be so hot that premature curing of the resin begins to occur. Thus, the process is preferably carried out at temperatures of from 40° C. to 100° C.

The resin is typically spread onto the external surface of a roller and coated onto a paper or other backing material to produce a layer of curable resin. The resin can then be brought into contact, and optionally also impregnated, by passing the structural layer, open-structured sheet (structured thermoplastic polymer layer) and resin-coated paper through rollers. The resin may be present on one or two sheets of backing material, which are brought into contact with the structural layer and open-structured sheet (structured thermoplastic polymer) by passing them through heated consolidation rollers to impregnate.

If a backing sheet is to be applied then this can be carried out either before or after impregnation of the resin. However, it is typically applied before or during impregnation as it can provide a non-stick surface upon which to apply the pressure required for resin impregnation. Typically the backing sheet is the one on which the resin was mounted, although it can be removed and replaced with a different sheet as desired.

Once prepared the prepreg is typically rolled-up, in which form it can be stored for a period of time. It can then be unrolled and optionally laid up with other prepregs to form a prepreg stack as defined herein.

Once prepared, the prepreg or prepreg stack is cured by exposure to elevated temperature, and optionally elevated pressure, to produce a cured laminate. As discussed above, the prepregs of the present invention can provide excellent toughness without requiring the high pressures encountered in an autoclave process.

Thus, in further aspect, the invention relates to a process of curing a prepreg or prepreg stack as described herein, the process involving exposing the prepreg to a temperature sufficient to induce curing and carried out at a pressure of less than 3.0 bar absolute.

The curing process may be carried out at a pressure of less than 2.0 bar absolute. In a particularly preferred embodiment the pressure is less than atmospheric pressure. The curing process may be carried out at one or more temperatures in the range of from 80 to 200° C., for a time sufficient to cause curing to the desired degree.

Curing at a pressure close to atmospheric pressure can be achieved by the so-called vacuum bag technique. This involves placing the prepreg or prepreg stack in an air-tight bag and pulling a vacuum on the inside of the bag. This has the effect that the prepreg stack experiences a consolidation pressure of up to atmospheric pressure, depending on the degree of vacuum applied.

Once cured, the prepreg or prepreg stack becomes a cured composite laminate, suitable for use in a structural application, for example an aerospace structure.

Such composite laminates can comprise structural fibres at a level of from 55% to 70% by volume, preferably from 58% to 65% by volume.

The present invention has particular application as an alternative to epoxy-based prepreg where the insoluble interleaf toughening agent is provided as resin-insoluble thermoplastic particles. For example, see U.S. Pat. No. 7,754,322 B2 and WO 2008/040963. These types of epoxy resins that are used to form toughened interleaf zones typically include a soluble thermoplastic toughening agent, such as polyethersulfone or polyetherimide. These soluble toughening agents are included in amounts that range from 5 to 25 weight percent of the overall resin composition. The soluble toughening agents are typically added to the epoxy resin mixture prior to addition of the curing agent and heated to an elevated temperature to dissolve the thermoplastic curing agent and then cooled. Insoluble thermoplastic particles, the curing agent and any other additives are added to the resulting mixture and then used in combination with fiber layers to form prepreg. The insoluble thermoplastic particles are typically added in amounts of between 1 and 15 weight percent of the overall resin composition.

During prepreg and laminate formation, as well as curing of the laminate, the insoluble particles, which generally have mean particle sizes between 5 and 60 microns, become concentrated in the interleaf zones and other areas outside of the structural fibre layers. This is because the substantial majority of insoluble particles are too large to enter into the interstitial openings of the fibre layer. Due to processing and other manufacturing considerations, the particle powders that are used as the insoluble thermoplastic tougheners may have small amounts of particles that are substantially smaller or larger than the target size range. The smaller particles present a problem in that they can migrate into the fibre layers during laminate formation and curing where their effectiveness as an interleaf toughener is diminished. The larger particles present a problem with respect to possible disruption of the interleaf zone during curing of the laminate due to their relatively large size.

The present invention involves providing structured thermoplastic polymer layers that are uniformly thick and contain insoluble fibers that cannot possibly enter into the structural fiber layers. The layer thicknesses and densities are chosen so that the amount of insoluble thermoplastic toughener located within the interleaf zone falls within the same range as is provided by using the above-described resins that contain insoluble thermoplastic particles. The present invention provides the dual advantage of making sure that all of the insoluble thermoplastic toughener that is present in the prepreg remains in the interleaf zones of the laminates while at the same time insuring that the interleaf zone is not disrupted due to variations in thermoplastic material sizes and shapes.

The unique properties of lightweight veils of thermoplastic fibres, and other similar structured thermoplastic polymer layers, make it possible to cure the laminates using such veils in an out-of autoclave process. This relatively low pressure and low cost curing process can be used because the damage tolerance (e.g. Compression After Impact—CAI) of the cured laminate is not substantially less than the damage tolerance achieved using the higher pressure and higher expense of an autoclave. In contrast, out-of-autoclave curing of laminates that have interleaf zones toughened with insoluble thermoplastic particles produces cured laminates that have damage tolerances that are significantly reduced.

For structural uses in aerospace and other high tolerance applications, it is preferred that a laminates in accordance with the present invention comprising 32 plies of 145 gsm fibre areal weight prepreg in a quasi-isotropic stack arrangement have a CAI value at 30 kJ (according to AITM 1.0010 or EN6038) of greater than 250 MPa, preferably greater than 300 MPa.

One embodiment of the invention involves a hybrid structured thermoplastic layer or hybrid open-structured sheet in which a soluble thermoplastic material is coated on or otherwise secured to a substrate. The substrate used in this hybrid structured thermoplastic layer comprises a non-woven material. Hence the substrate ideally comprises any of the following either alone or in combination: aramid, glass, ceramic, hemp, polyamide or polyolefin. Polyamide or carbon fibers are particularly useful for forming the substrate. One suitable substrate is a fibrous Nylon veil commercially available from Protechnic of France and is of 5 gsm weight.

This so-called hybrid membrane ideally has a weight per unit area in the range from 1 to 25 gsm and/or a thickness in the range from 5 μm to 25 μm.

The hybrid structured thermoplastic layer can be applied to a prepreg as a separate layer, either next to the prepreg's reinforcement or on the resin surface or otherwise used in a direct process such as within an RTM preform. The hybrid can be applied prior, during or after the impregnation process for standard film impregnation of woven or unidirectional fibres.

A preferred, but not exclusive application is in direct composite manufacturing processes, particularly those comprising unidirectional reinforcements.

In this hybrid embodiment of the invention, the thermoplastic is ideally heat treated in order to reduce its speed of dissolution in the matrix resin.

The thermoplastic material may be applied to the substrate in any desired pattern.

Figure 6:
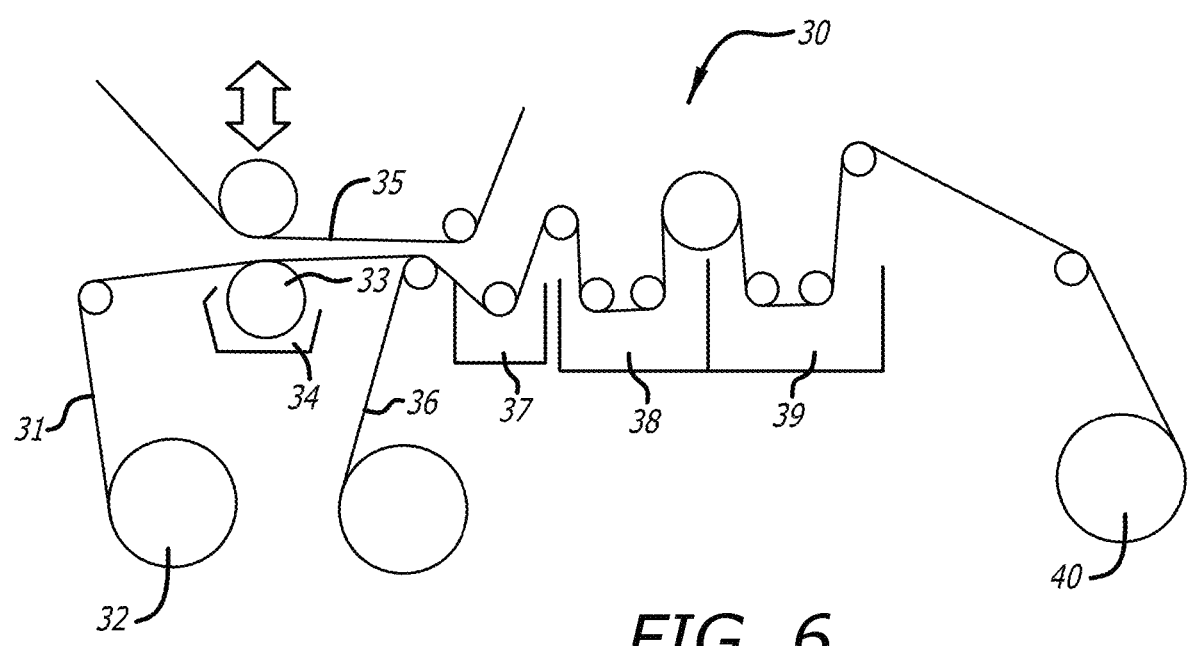
FIG. 6 is a diagrammatic view showing an exemplary process for making a hybrid layer of structured thermoplastic polymer in which a veil of polyamide fibers are coated with polyethersulfone.

An exemplary process for making a hybrid structured thermoplastic layer is shown in FIG. 6. FIG. 6 shows processing equipment 30 whereby a 5 gsm veil 31 of non-woven polyamide material is fed from a roll 32 over a coating roller 33 which coats the veil 31 with a polymer dope from a polymer dope reservoir 34. The polymer dope comprises a mixture of DMSO (dimethyl sulfoxide). PES (polyether sulfone) and Orgasol™ polyamide. Support is provided for the veil via upper and lower polythene webs 35 and 36. The coated veil is fed through a coagulation bath 37 and subsequently through two wash baths 38 and 39 charged with water. The wet coated substrate then passes to a storage roller 40. The roll 40 is subsequently passed through vertical ovens (not shown) to provide a finished dried product attached to the polythene webs which are easily removable.

The final product, not including the polyethylene webs, weighed approximately 6 to 7 gsm and contained about 2-3 gsm of PES.

Figure 7:
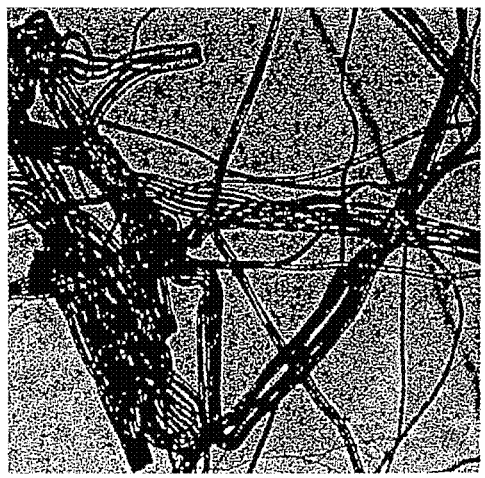
FIG. 7 shows the polyamide veil used in the process shown in FIG. 6 prior to its being coating with polyethersulfone.
Figure 8:
FIG. 8 shows the polyamide veil of FIG. 7 after it has been coated according to the process shown in FIG. 6 to form a hybrid layer of structured thermoplastic polymer.

FIG. 7 shows the polyamide veil material that was used as the substrate in the process illustrated in FIG. 6. Here veil fibrous elements can be seen. Comparing with FIG. 8, showing a micrograph of the coated veil, solidified PES can be observed as the transparent material between the veil fibrous elements. Likewise, undissolved Orgasol, which provides additional toughening to the cured laminate, can be observed as small dark dots.

FIG. 8 shows the dried PES thermoplastic material coated on the polyamide veil. This exhibits discrete pore arrangements.

Another embodiment of a structured thermoplastic layer in accordance with the present invention involves the formation of film of thermoplastic polymer that includes an epoxy and a curative for the epoxy as set forth in Example 8.

The invention will now be illustrated by reference to the following examples.

Example 1 (Prepreg A)

A sheet of 145 gsm IM7-12K UD fibre surrounded on both sides by an open-structured sheet (4 gsm (128D04 from Protecnic, France)) was made. A prepreg was made from this open-structured sheet and UD fibre by applying to either side an epoxy-based M56 resin film (a mixture of MY721 epoxy resin (available from Huntsman) with dissolved polyethersulphone and methylene bisaniline curative) of 36 gsm and passing through consolidation rollers to form a prepreg. The resultant prepreg had a resin content of 32%.

Comparative Example 2 (Prepreg B)

A comparative prepreg was manufactured as in Example 1 using UD fibre but without the veil to form a prepreg of the same areal weight and with a resin content of 35%.

Example 3 (Prepreg C)

A prepreg was manufactured by applying 36 gsm M56 resin films to either side of 134 gsm AS7-12K UD fibre and passing through consolidation rollers. Subsequently, 128D04 veil was then applied to one side of the prepreg before passing through a further set of consolidation rollers. The resultant prepreg according to the invention had a resin content of 35%.

Comparative Example 4 (Prepreg D)

A comparative prepreg was made according to Example 3 but without the open-structured sheet and had a resin content of 35%.

Comparative Example 5 (Prepre E)

A modified M56 resin was produced by adding during mixing, 10% Orgasol 1002 DNATL particles (20 micron PA6) available from Arkema. A prepreg was made from this modified M56 resin by applying 39 gsm film either side of 145 gsm UD IM7-12K fibres and passing through consolidation rollers to form a prepreg. The resultant prepreg had a resin content of 35%.

Comparative Example 6 (Prereg F)

A modified M56 resin was produced by adding during mixing, 10% Micropan 777 particles (7 micron PA6) available from Chemopharma, Czech Republic. A 35% resin content prepreg with 145 gsm IM7-12K fibres was made in the same way as Example 5.

Manufacture of Composite Laminates

Prepregs A-F, were used to manufacture 32 ply quasi-isotropic laminates of size 400×400 mm. The plies were debulked every four plies. The laminates were cured in a vacuum bag inside an air-circulating oven according to the following cure cycle.

ramp to 110° C. at 1° C./min
dwell 110° C. for 60 minutes
ramp 1° C./min to 180° C.
dwell 180° C. for 120 minutes.

The vacuum level was reduces to half vacuum (−0.5 bar) after the end of the 110° C. dwell. Prior to that vacuum level was greater than −0.9 bar The laminates produced were designated laminates A-F, according to their corresponding prepregs.

Laminate Thickness

Laminate thickness and cured ply thickness are shown in the Table I below. A comparison of A to B and C to D shows that using the structured thermoplastic does not increase laminate thickness even when curing with vacuum pressure only.

TABLE 1

| Laminate | Laminate thickness (mm) | Cured ply thickness cpt (mm) |
|---|---|---|
| A | 1.70 | 0.147 |
| B (Comparative) | 4.77 | 0.149 |
| C | 4.51 | 0.141 |
| D (Comparative) | 4.41 | 0.138 |
| E (Comparative) | 4.78 | 0.149 |
| F (Comparative) | 4.99 | 0.156 |

CAI Measurements

Laminates A-F were tested for compression strength after impact according to test method AITM 1.0010 (EN6038). Laminates according to the invention (A and C) can be seen to have significantly improved CAI strengths over laminates without an open-structured sheet (B and D). Laminate A, which uses the same IM7-12K fibres as laminates E and F, has a significantly higher CAI value. This demonstrates the advantage of using structured thermoplastic polymer layers in accordance with the invention instead of thermoplastic particles when curing out of the autoclave.

TABLE 2

| Impact | CAI Strength (MPa) | | | | | |
|---|---|---|---|---|---|---|
| Energy (J) | A | B | C | D | E | F |
| 10 | 411 | 348 | — | — | 338 | 338 |
| 20 | 411 | 276 | — | — | 309 | 307 |
| 25 | 326 | 259 | — | — | 272 | 255 |
| 30 | 339 | 223 | 277 | 184 | 280 | 246 |
| 40 | 285 | 217 | — | — | 225 | 235 |
| 50 | 250 | 180 | — | — | 215 | 204 |

Other Mechanical Properties

Other composite properties for materials C and D were tested according to the table below. The results demonstrate that the veil does not have any detrimental effect on these other properties.

TABLE 3

| Test | Test Standard | Conditions | Laminate C | Laminate D (Comparative) |
|---|---|---|---|---|
| OHC strength (MPa) | AITM 1.0008 | 70° C. Wet | 246 | 230 |

TABLE 3-continued

| Test | Test Standard | Test Conditions | Laminate C | Laminate D (Comparative) |
|---|---|---|---|---|
| OHT strength (MPa) | AITM 1.0007 | 70° C. Wet | 339 | 352 |

Example 7 (Hybrid-Polyamide Veil Coated with PES)

The hybrid layer or membrane made in accordance with the process described in FIG. 6 was incorporated into a laminate in resin transfer moulding. In this moulding, Hexflow® RTM6 (from Hexcel Corporation) thermoset epoxy resin was used as the matrix resin. Preforms were assembled consisting of 16 plies of 268 g aramid unidirectional fibre with a layer of hybrid non-woven material between each ply. This preform was then placed into a heated mould cavity (4 mm thickness) and Hexflow® RTM6 was injected at a temperature of 100° C. After resin injection the temperature of the mould was raised to 180° C. and the laminate cured for 2 hours at 180° C. before cooling and demolding.

The laminates provided were tested for compression after impact (CAI) and bearing strength and the results are shown Table 4.

TABLE 4

| Laminate Type | CAI (Mpa) | Bearing Strength (Mpa) |
|---|---|---|
| RTM6 thermoset epoxy | 169 | 859 |
| RTM6 thermoset and PES/aramid membrane | 206 | 897 |

The incorporation of the PES coated polyamide hybrid layer into the composite material having the Hexflow® RTM6 thermoset resin matrix resulted in improvements in both CAI and bearing strength.

Example 8 (Polymer Film or Membrane with Epoxy and Curative)

A polymer dope was prepared from 98 grains of dimethylsulfoxide, 2 ml of 10%-aqueous 20 sodium acetate solution and 25 grams of polyethersulfone. 0.72 g of tetraglycidyl derivative of diaminodiphenylmethane, which is an epoxy resin sold as Araldite MY721 by Huntsman (Basel, Switzerland) and 0.53 g of 4,4-methylenebis(2-methyl-5-isopropylaniline), which is a curing agent for the epoxy resin that is sold by Lonza (Basel, Switzerland). The epoxy resin and curing agent were incorporated into 10 ml of the dope and cast onto a stippled surface and then precipitated from water. When washed and dried, the layer comprised a white, strong veil which when heated at 180° C. for two hours gave a clear, flexible, tough epoxy-reinforced PBS film or membrane.

The membranes described herein are free from fibre crossover points that act as stress concentrators. It is intended that the membranes described herein form part of a curable composite assembly. Therefore, by soluble it is meant at least partially soluble in a matrix resin which forms part of the assembly. Furthermore, the membrane is soluble only during cure of the assembly.

Therefore, the membranes describe herein may be made from any suitable thermoplastic polymer. The polymer is limited only by its ability to dissolve in the matrix resin during curing of said resin. Such matrix resins, as will be described hereinafter, are typically thermosetting resins.

Suitable thermoplastic polymers for use in the membrane of the present invention include any of the following either alone or in combination: polyether sulfone (PBS), polyetherethersulfone (PEES), polyphenyl sulfone, polysulfone, polyimide, polyetherimide, aramid, polyamide, polyester, polyketone, polyetheretherketone (PEEK), polyurethane, polyurea, polyarylether, polyaylsulfides and polycarbonates.

Although the terminal group of the chosen polymer is not material to the invention, reactive terminal groups are preferable in order to link the polymer membrane and the matrix resin upon curing. Forming such a link enhances the toughness of the cured composite assembly of which the membrane forms parts.

Preferably, the polymers of the present invention comprise at least one linking member in order to link together the polymer membrane and the matrix resin upon curing. The linking member may be a particular terminal group or a side-chain functional group present on the polymer.

Suitable terminal and/or side-chain groups include any of the following either alone or in combination: hydroxyl, chloro, amino, isocyanato, cyonato, glycidyl, carboxyl, nitro and sulfato.

The polymer preferably has a number average molecular weight in the range of from 100 to 10,000,000 daltons and most preferably from 10,000 to 1,000,000 daltons.

The membranes described herein may comprise a plurality of apertures of varying shapes so as to provide an openwork structure. Advantageously, the shape and frequency of the apertures can be tailored to the specific physical characteristics e.g. viscosity, of the resin in order that the resin can flow through the apertures and be evenly distributed through the composite assembly.

The presence of apertures eliminates the need to mechanically perforate a continuous membrane in order to facilitate the flow of resin therethrough. The membranes made in accordance with the matrix and described herein are stronger than mechanically perforated membranes such that the risk of tearing the film during its production is minimised.

The apertures of the present invention may take a variety of pattern formats. Non-limiting examples include, fabric (so-called linen pattern), lattice, trellis, mesh, mat, net, stipple, pyramidal, hexagonal, rhomboid, hammered, knurled, lozenge and grid.

More than one pattern format may be present in a membrane in order to achieve particular properties. For example, combining pattern formats may result in a preferential strength or infusibility in a particular region of the membrane.

These varying patterns allow a membrane to be tailored to a particular system. The pattern selection is influenced by the viscosity of the matrix resin of the composite assembly. Clearly, a lower viscosity resin can pass through a smaller sized aperture and vice versa. In the case of a resin soluble membrane, the infusion of a laminate containing a membrane described herein must be performed at a temperature below the dissolution temperature of the membrane, to avoid washing or viscosity build up.

Although the membranes described hereinbefore have a fabric like appearance, such membranes are non-fibrous. It is this non-woven nature which gives the membranes described herein a significant advantage over prior art fibrous materials. The membranes described herein do not contain fibre cross-over points, as with woven fabrics, which cause local deformation of the reinforcing fibres. Furthermore the membranes described herein are of a uniform thickness. This is a particular advantage for vacuum infusion processes as it provides reduced interlayer thickness and enables higher volume fraction fibre composites to be produced, as required by the aerospace industry.

The membranes described herein preferably have an areal weight in the range of from 3 to 50 $gm^{-2}$ and more preferably in the range of from 5 to 25 $gm^{-2}$.

The membranes described herein are preferably such that from 1 to 90% of the surface area of the membrane is apertured, so as to be open. More preferably from 5 to 50% of the surface area of the membrane is apertured so as to be open.

The membranes described herein may comprise one or more additional components which are useful in the cured composite of which the membrane forms a part. Such components include, but are not limited to, any of the following either alone or in combination: toughening particles, fillers, intumescent agents, flame retardants, pigments, conducting particles, short fibres, resins and curing agents.

Toughening particles may include any of the following either alone or in combination: polyamides, copolyamides, polyimides, aramids, polyketones, polyetheretherketones, polyesters, polyurethanes, polysulfones, high performance hydrocarbon polymers, liquid crystal polymers, PTFE, elastomers and segmented elastomers.

Preferably, toughening particles constitute from 0.1% to 80% by weight of the total weight of the membrane and most preferably from 1% to 50% by weight of the total weight of the membrane.

Suitable fillers may include any of the following either alone or in combination: silicas, aluminas, titania, glass, calcium carbonate and calcium oxide. Preferably, fillers constitute from 0.1% to 30% by weight of the membrane.

Suitable conducting particles include any of the following either alone or in combination: silver, copper, gold, aluminium, nickel, conducting grades of carbon, buckminsterfullerene, carbon nanotubes and carbon nanofibres. Metal coated fillers may also be used, for example nickel, coated carbon particles and silver coated copper particles.

Preferably the conducting particles constitute from 0.1% to 98% by weight of the total membrane weight and more preferably from 10% to 90% by weight of the total membrane weight.

During cure of a composite assembly the polymeric material for the membrane dissolves leaving the insoluble moieties precisely located, in a depth wise sense, within the cured assembly.

Suitable insoluble moieties for inclusion in the membrane include any of the following either alone or in combination: intumescents, pigments, mould release agents, nano sized particles and conducting particles.

According to a second aspect of the present invention there is provided the use of an at least partially soluble, non-fibrous, apertured membrane comprising at least one soluble thermoplastic polymeric material for delivering at least one insoluble moiety to a precise location within a cured composite assembly and wherein said membrane has a discrete porous structure.

The present invention further seeks to provide a composite assembly having excellent toughness properties whereby it is possible to control the location of toughening agent within the assembly.

According to a further aspect of the present invention there is provided a curable composite assembly comprising a polymeric matrix resin, a fibrous reinforcement material and at least one non-fibrous, at least partially soluble, apertured, membrane wherein said membrane comprises at least one thermoplastic polymeric material soluble in the matrix resin and wherein said membrane has a discrete porous structure.

The assemblies of the present invention may be prepared by either direct or indirect processes. That is, the assemblies of the present invention may be prepreg, an indirect process, prepared by incorporating the layers into the assembly during the prepregging. Alternatively they may be assemblies prepared by direct processes, such as RTM, VaR.TM or RFL For prepreg made by a solvent process, the membrane would be interleaved or consolidated onto the reinforcement just prior to final wind-up of the product. For hot melt prepreg processes, the membrane can either be laminated onto the reinforcement prior to final wind-up or it could be positioned on or into the reinforcement prior to combining the reinforcement with the matrix film. Such techniques are well known to those skilled in the art.

In the case of RTM, VaRTM and RFI processes, assemblies are prepared by applying the membranes described herein to the dry fibrous material of the preforms. There are some reinforcement materials, such as multiaxial textiles where it is possible to locate the membrane in between individual layers comprising the textile. The matrix resin is of a viscosity such that, during the resin injection stage, the resin passes through the membrane into the fibrous material. These technologies are described in chapter 9 of "Manufacturing Processes for Advanced Composites", F.C. Campbel Elseveir, 2004.

The preferred thennoset matrices for RIM processes are epoxy or bismaleimide (BMI) with suitable epoxy examples being HexFlow® RTM 6 or RTM 120. A typical BMI matrix is HexFlow® RTM 65 L HexFlow® VRM 34 may be used for Vacuum-assisted Resin Transfer Moulding (VaRTM) applications. All of the above materials are available from Hexcel Composites, Duxford, UK.

The reinforcement fibres can be selected from any of the following commercially available high performance fibres which may be used alone or in combination: aramid (e.g. Kevlar™), glass, carbon, ceramic, hemp, or polyolefin. Carbon fibres are the preferred material, particularly standard or intermediate modulus fibres of between 3000-24000 filaments per fibre tow. The desirable reinforcement form is a woven or non-crimped textile structure of between 150-1000 $gm^{-2}$ fibre areal weight. Typical weave styles include plain, satin and twill weaves. Non-crimped or multiaxial reinforcements can have a number of plies and fibre orientations such as +45/−45; 0/+45/−45; 0/+45/−45/90. Such styles are well known in the composite reinforcement field and are available from a number of companies including Hexcel Reinforcements, Villeurbanne, France.

The present invention also provides a method by which the membranes described herein can be made.

Therefore, according to a still further aspect of the present invention there is provided a method for the preparation of a non-fibrous, at least partially soluble, apertured, porous membrane comprising at least one soluble thermoplastic polymeric material said method comprising the steps of:
  a) preparing a polymer dope solution comprising said thermoplastic polymeric material in solvent;
  b) casting said dope solution;

c) bringing the cast dope solution into contact with a coagulation means so as to form a membrane;
d) removing at least some of the solvent from the membrane; and
e) drying the membrane.

The method of the present invention is also preferable to prior art casting processes as these do not allow for the formation of precisely defined microporous structures. The polymer dope solution is prepared by dissolving the polymeric material in a solvent or mixture of solvents. Any solvent conventionally used for preparing polymer solution may be used. However, preferred solvents are those which are substantially entirely miscible with water. More preferably suitable solvents are aprotic solvents and most preferably suitable solvents are polar aprotic solvents.

Therefore, suitable solvents for use in the method of the present invention include any of the following either alone or in combination: dimethyl sulfoxide, dimethyl formamide, dimethylacetamide, 1-methylpyrrolidone, tetramethylurea, gamma-butyrolactone, propylene carbonate and ethylene carbonate.

The solvent or solvent mixture referred to above may also comprise a co-solvent in order to modify the solution characteristics of the solvent.

Suitable co-solvents include any solvent which is completely miscible with any of the aforementioned solvents. Suitable examples include glycol ethers and alcohols. The solvent for use with the present invention may contain other soluble additives to aid in the coagulation and washing stages of the process. For example, lithium chloride, potassium chloride, calcium chloride, sodium acetate, surfactants such as sodium dodecylsulfate and the like.

The polymer dope solution of the present invention preferably comprises from 5% to 90% by weight of polymer, more preferably from 5% to 50% by weight of polymer and most preferably from 10% to 35% by weight of polymer.

The polymer dope solution may also comprise one or more additional components useful in a cured composite. Such additives include, but are not limited to, any of the following either alone or in combination: toughening particles, fillers, intumescent agents, flame retardants, pigments, conducting particles, short fibres, resins and curing agents. In, fact, any material that is insoluble in the coagulation and washing liquids can be added to the polymer dope solution.

Examples of suitable additional components are described above in respect of the membrane per se.

Chemically reactive components may also be included in the polymer dope solution. Suitable reactive components are preferably insoluble in the coagulation and washing liquids used in the process for the present invention. In practice, most epoxy resins, cyanate ester resins and most curing agents used in thermosetting systems are very insoluble in water and are therefore suitable for use with the present invention.

The polymer dope solution may be cast onto a substrate or directly onto a patterned roller, such as a gravure roller such as those used in printing processes.

Suitable substrates include sheet material comprising polyethylene and copolymers of ethylene, oriented polypropylene, polypropylene and copolymers of propylene, polyamide, polyester and similar materials. The substrates may be untreated or may be surface coated. Suitable surface coating materials include silicone release compounds with polyethylene and low density polyethylene being particularly preferred.

Alternatively, the substrate may be porous and in the form of one or more continuous belts. These substrates are well known in the papermaking industry and may comprise a wire mesh, fibre mesh, felt or similar. Such an arrangement allows for greater washing efficiency and more rapid manufacture with reduced tendency for the film material to break.

In order to provide an apertured membrane of a particular open work pattern the substrate is suitably embossed in order to create said pattern.

Following casting the material is contacted by a coagulation means in order to form a film. Said coagulation means may be a coagulation bath comprising a coagulation liquid. The coagulation liquid may be water or another liquid such as methanol, ethanol, propanols, acetone, and their aqueous mixtures. During coagulation the polymer separates into a membrane having a microporous structure.

After coagulation, the polymeric membrane is passed through at least one wash bath in order to remove any coagulation liquid from the membrane. The wash bath comprises water which optionally comprises additives and solvents such as alcohols to increase the rate of washing, enzymes or other agents to accelerate the degradation of extracted solvents, wetting agents and the like. The washing stage may advantageously be conducted using warm water (up to 50° C.) and/or agitation to further increase the rate of solvent removal.

Other methods for increasing the rate of solvent removal may be employed, for example ultrasonics.

For the manufacture of a membrane having an interconnected microporous structure it is preferable to remove the majority of the solvent from the membrane during the washing stage. Following washing it is preferable that the membrane comprises a maximum of 10% solvent with respect to the total membrane weight and it is more preferable that the membrane comprises a maximum of 5% solvent with respect to the total weight of the membrane. Further solvent may be removed during the drying process.

For the manufacture of a membrane having a substantially discrete microporous structure it is preferable to remove up to 90% of solvent from the membrane. If too much solvent is removed, a membrane having a discrete pore network cannot be produced. In this case, during the subsequent drying process the interconnecting sub-micron pores formed during coagulation are converted to micron sized discrete pores.

Following washing the membrane is dried. Drying is preferably achieved using one or move ovens. That said the membrane can be dried at room temperature i.e. 20-25° C. Typically, drying takes place at a temperature within the range of 70° C. to 200° C. However, the precise temperature is dependent upon the nature of the polymer from which the membrane is made and the substrate etc. Clearly, drying the membrane at an elevated temperature accelerates the drying procedure.

In a further embodiment of the invention, the membrane is made by casting the polymer dope onto a pre-existing veil.

According to a further aspect of the present invention there is provided an at least partially soluble, apertured membrane, comprising at least one soluble thermoplastic material secured to a substrate, the thermoplastic material having a discrete porous structure.

The preferably insoluble non-woven substrate provides strength and enables low weights of soluble polymer to be readily introduced into a composite. The resin interface between the substrate veil material and resin matrix is toughened, thereby imparting additional toughness to the final composite part.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. A method for forming a film to be located between the fibrous layers of a composite material, said method comprising the steps of:
    a) dissolving polyethersulfone or polyetherimide in a solvent to form a polymer dope;
    b) dispersing an epoxy resin and a curing agent for said epoxy resin in said polymer dope to form an epoxy-enriched polymer dope;
    c) casting said epoxy-enriched polymer dope onto a surface to form a dope layer, said dope layer being free of fibers;
    d) removing the solvent from said dope layer to form a fiber free veil; and
    e) heating said fiber free veil to form said film.

2. A method according to claim 1 wherein the step of removing the solvent from said dope layer comprises the steps of washing and drying said dope layer.

3. A film that is made according to the method of claim 1.

4. A composite material comprising a preform for use in resin transfer moulding wherein said preform is placed in a mould cavity and uncured resin is injected into said preform within said cavity, said preform comprising a plurality of fibrous layers comprising woven or unidirectional fibers wherein a film according to claim 3 is located between each of the fibrous layers.

5. A composite material comprising a prepreg comprising a thermosetting resin and a plurality of fibrous layers comprising woven or unidirectional fibers wherein a film according to claim 3 is located between each of the fibrous layers.

6. A composite part that comprises a preform according to claim 4 that has been infused with a thermosetting resin and cured to form said composite part.

7. A composite part that comprises a prepreg according to claim 5 that has been cured to form said composite part.

* * * * *